(12) United States Patent
Carter

(10) Patent No.: US 9,126,767 B2
(45) Date of Patent: Sep. 8, 2015

(54) CONVEYOR BELT ROLLER REPLACEMENT

(71) Applicants: SANDPIT INNOVATION PTY LTD, Perth, Western Australia (AU); LEWIS AUSTRALIA PTY LTD, Moorabbin, Victoria (AU)

(72) Inventor: Aaron Leigh Carter, Perth (AU)

(73) Assignees: Sandpit Innovation Pty Ltd, Perth (AU); Lewis Australia Pty Ltd, Moorabbin (AU)

( * ) Notice: Subject to any disclaimer, the term of this patent is extended or adjusted under 35 U.S.C. 154(b) by 0 days.

(21) Appl. No.: 14/386,613

(22) PCT Filed: Jan. 15, 2013

(86) PCT No.: PCT/AU2013/000026
§ 371 (c)(1),
(2) Date: Sep. 19, 2014

(87) PCT Pub. No.: WO2013/138841
PCT Pub. Date: Sep. 26, 2013

(65) Prior Publication Data
US 2015/0082596 A1    Mar. 26, 2015

(30) Foreign Application Priority Data

Mar. 21, 2012   (AU) ................................ 2012901146

(51) Int. Cl.
*B65G 39/12*   (2006.01)
*B65G 43/00*   (2006.01)
(Continued)

(52) U.S. Cl.
CPC ............... *B65G 39/02* (2013.01); *B65G 15/00* (2013.01); *B65G 43/00* (2013.01); *B66F 11/00* (2013.01); *B65G 21/06* (2013.01); *B65G 39/10* (2013.01); *B65G 39/12* (2013.01); *Y10S 901/02* (2013.01)

(58) Field of Classification Search
CPC ........ B65G 15/00; B65G 39/02; B65G 43/00; B65G 21/06; B65G 39/10; B65G 39/12; B66F 11/00; Y10S 901/02
USPC ......................................... 198/617, 824–830
See application file for complete search history.

(56) References Cited

U.S. PATENT DOCUMENTS 3,575,274 A    4/1971   Ewing et al.
3,614,823 A *  10/1971  Weber et al. .................... 29/720
(Continued)

FOREIGN PATENT DOCUMENTS

DE    2006252 A1    8/1971
SU    1278280 A1    12/1986

OTHER PUBLICATIONS

International Search Report for PCT/AU2013/000026, mailed Feb. 15, 2013; ISA/AU.
(Continued)

*Primary Examiner* — Mark A Deuble
(74) *Attorney, Agent, or Firm* — Harness, Dickey & Pierce, PLC

(57) ABSTRACT

The invention provides for apparatus (10) for lifting a conveyor belt (13) supported on a series of idler rollers (19) on a belt conveyor (11), the apparatus (10) comprising a body (4) selectively movable along the belt conveyor (11) and a belt lifting assembly (50) mounted on the body (41) and operable to engage the conveyor belt (13) to lift the belt from, and subsequently lower said belt onto, an idler roller operatively supporting the belt on the conveyor (11).

15 Claims, 10 Drawing Sheets

(51) Int. Cl.
*B65G 15/00* (2006.01)
*B65G 39/02* (2006.01)
*B66F 11/00* (2006.01)
B65G 21/06 (2006.01)
B65G 39/10 (2006.01)

(56) References Cited

U.S. PATENT DOCUMENTS

2008/0060909 A1* 3/2008 DeVries .................. 198/300
2010/0224845 A1* 9/2010 Dowling ................. 254/93 HP
2014/0262695 A1* 9/2014 Hoffmann ................. 198/837
2014/0283351 A1* 9/2014 Kahrger et al. ........... 29/402.08
2014/0343722 A1* 11/2014 Nancarrow et al. .......... 700/230
2015/0033977 A1* 2/2015 Kahrger et al. .............. 104/306

OTHER PUBLICATIONS

International Preliminary Report on Patentability (Chapter II) with annexes, mailed May 27, 2013; IPEA/AU.

* cited by examiner

CONVEYOR BELT ROLLER REPLACEMENT

CROSS REFERENCE TO RELATED APPLICATIONS

This application is a U.S. National Phase Application under 35 U.S.C. 371 of International Application No. PCT/AU2013/000026 filed on Jan. 15, 2013 and published as WO 2013/138841 A1 on Sep. 26, 2013. This application is based on and claims to from Australian Patent Application No. 2012901146 filed on Mar. 21, 2012. The entire disclosures of all of the above applications are incorporated herein by reference.

TECHNICAL FIELD

This invention relates to replacement of idler rollers in endless belt conveyors.

More particularly, the invention is concerned with lifting a conveyor belt of a belt conveyor to facilitate replacement of an idler roller. The invention is also concerned with the performance of an idler roller replacement operation on a belt conveyor.

The Invention has been devised particularly, although not necessarily solely, for automated belt conveyor idler roller replacement.

BACKGROUND ART

The following discussion of the background art is intended to facilitate an understanding of the present invention only. The discussion is not an acknowledgement or admission that any of the material referred to is or was part of the common general knowledge as at the priority date of the application.

Belt conveyors are generally used for materials handling and transportation. In particular, belt conveyors are commonly used for transportation of particulate materials; for example, in mining and grain-handling applications.

A belt conveyor typically comprises an endless conveyor belt passing around end rollers to define an upper load-carrying run and a lower return run. The upper and lower runs are supported at intervals by a series of sets of idler rollers. Each roller set usually includes two or more idler rollers disposed in an end-to-end relation and positioned to engage the underside of the respective run effectively distributing a downward force of the conveyor belt between them. Where the load carrying run is of trough configuration, the idler roller sets each typically comprise a horizontal central roller and two inclined side rollers on opposed ends of the central roller arranged to guide the trough configuration of the belt between them.

There may be a need to change such idler rollers over time, such as when they become defective. The procedure, which is sometimes referred to as roller change-out, typically entails stopping the conveyor, getting access to the rollers by, for example, lifting the section of the conveyor belt at which the defective idler roller is located from the rollers to provide access to the roller, removing and replacing the defective roller, and then returning the lifted section of the conveyor belt to the original position so that it is supported on the replacement roller. In certain circumstances, it may also be necessary to remove the material being carried on the conveyor belt in order to access the rollers supporting the belt.

Accordingly, it is often necessary that operation of the belt conveyor be stopped so that the belt is not moving during the roller change-out procedure. The requirement to stop operation of the belt conveyor can lead to significant losses, both in terms of time and production opportunities. For example, in a mining environment, movement of product on a conveyor may translate to thousands of dollars per hour, with a stoppage of any number of minutes equating to significant losses.

Further, the roller removal and replacement step in the roller change-out procedure is typically performed manually. This can be disadvantageous as it requires use of trained personnel, can also be time consuming, and may expose personnel to hazardous working positions. Stopping operation of a conveyor is particularly important where a roller change-out is done manually, as it forms a major safety concern for the personnel performing the roller change-out.

It is against this background, and the problems and difficulties associated therewith, that the present invention has been developed.

It is an object of the present invention to overcome, or at least ameliorate, one or more of the deficiencies of the problems mentioned above, or to provide a useful or commercial option for performing a roller change-out on a belt conveyor.

SUMMARY OF THE INVENTION

According to a first aspect of the invention there is provided apparatus for lifting a conveyor belt from an idler roller of a belt conveyor, the apparatus comprising:

a body selectively movable along the belt conveyor; and a belt lifting assembly mounted on the body and operable to engage the conveyor belt to lift the belt from, and subsequently lower said belt onto, an idler roller operatively supporting the belt on the conveyor.

The apparatus is particularly applicable to an automated or remote controlled roller change-out operation as the body can be progressively moved along the belt conveyor to various locations at which idler rollers require replacement with minimum or no human intervention.

Typically, the belt lifting assembly is adapted to engage the belt and to also lift or lower the belt, whilst the belt is moving.

Typically, the belt lifting assembly comprises a belt support movable between a first position for engaging the conveyor belt to lift or to lower the conveyor belt, and a second position clear of the conveyor belt.

Typically, the belt support comprises a pair of support sections adapted to engage the underside of the conveyor belt from opposed sides thereof, the support sections being adapted to cooperate to provide support for the belt.

Typically, each support section comprises first and second support elements, the first support element being adapted to support an adjacent marginal edge portion of the conveyor belt and the second support element being adapted to support a central section of conveyor belt.

Typically, the support elements are configured as rollers. This is advantageous as it facilitates engagement of the belt and also lifting and lowering of the belt whilst the belt is moving.

Typically, the belt support further comprises a carrier for moving the pair of support sections into and out of engagement with the conveyor belt to lift and to lower the conveyor belt.

Typically, the carrier comprises a pair of carrier arms, each carrying one of the support sections.

Typically, each carrier arm is mounted for pivotal movement between operative and retracted positions for moving the respective support section into and out of position on the underside of the conveyor belt.

Typically, each carrier arm is also mounted for displacement when in the operative position to facilitate lifting and lowering the conveyor belt.

Typically, a power input device is operably connected to the pair of carrier arms to actuate the carrier arms for pivotal movement between the operative and retracted positions.

Typically, the power input device is operable to cause movement of the pair of carrier arms in unison between the operative and retracted positions.

Typically, belt lifting assembly comprises a plurality of the belt supports each movable between the respective first position for engaging the conveyor belt to lift and to lower the conveyor belt, and the respective second position clear of the belt, the plurality of the belt supports being disposed in a spaced apart relation for lifting a common section of the conveyor belt at intervals along a length thereof.

Typically, the plurality of the belt supports are configured to lift the common section of the conveyor belt at intervals along the length thereof to several different extents to provide a relatively smooth transition between the lifted section of the conveyor belt and the adjacent sections thereof which are not lifted.

Typically, the body selectively movable along the belt conveyor comprises a carriage.

Typically, the carriage is configured to straddle the conveyor belt.

Typically, the carriage comprises a frame structure upon which the belt supports are mounted.

Typically, the carriage is arranged for movement along a track associated with the belt conveyor.

Typically, the apparatus includes a securing mechanism for securing the apparatus to the track.

In one arrangement, the track may be incorporated on the belt conveyor. The track may, for example, be mounted on a frame forming part of the belt conveyor, the frame supporting a series of idler rollers on which the belt is supported. With this arrangement, the track may comprise two track rails mounted on the frame on opposed sides of the conveyor belt.

In another arrangement, the track may be separate from the belt conveyor. The track may, for example, comprise two track rails installed on opposed sides of the belt conveyor.

The apparatus may further comprise a drive system for propelling the carriage along the track.

The apparatus may further comprise a mechanism for replacing an idler roller from which the conveyor belt has been lifted.

Typically, the mechanism is arranged for automated replacement of idler rollers.

Typically, the mechanism comprises a robotic arm having means for gripping an idler roller.

According to a second aspect of the invention there is provided apparatus for performing a roller replacement operation on a belt conveyor having a conveyor belt supported on a series of idler rollers, the apparatus comprising a body selectively movable along the belt conveyor, a belt lifting assembly mounted on the body and operable to engage the conveyor belt to lift and to lower the conveyor belt, and means for replacing an idler roller from which the conveyor belt has been lifted.

Typically, the means for replacing an idler roller from which the conveyor belt has been lifted may be arranged for automated replacement of idler rollers.

Typically, the means for replacing the idler roller may comprise a robotic arm having means for gripping the idler roller.

The apparatus according to the second embodiment is particularly applicable to an automated roller change-out operation as the body can be progressively moved along the belt conveyor to various locations at which idler rollers require replacement.

Typically, the belt lifting assembly forming part of the apparatus according to the second aspect of the invention may incorporate any one or more of the aforementioned features of the corresponding belt lifting assembly forming part of the apparatus according to the first aspect of the invention.

Typically, the body selectively movable along the belt conveyor forming part of the apparatus according to the second aspect of the invention may incorporate any one or more of the aforementioned features of the corresponding body forming part of the apparatus according to the first aspect of the invention.

According to a third aspect of the invention there is provided a method of lifting a conveyor belt using apparatus according to the first aspect of the invention.

According to a fourth aspect of the invention there is provided a method of performing a roller replacement operation on a belt conveyor using apparatus according to the second aspect of the invention.

According to a fifth aspect of the invention there is provided a method of performing an idler roller replacement operation on a belt conveyor having a conveyor belt supported on a series of idler rollers, the method comprising: moving a belt lifting assembly along the belt conveyor to a location at which an idler roller requires replacement; operating the belt lifting assembly to engage the conveyor belt to lift the conveyor belt from the roller; replacing the roller; and operating the belt lifting assembly to lower the conveyor belt onto the replacement roller and to disengage from the conveyor belt.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Figure 1:
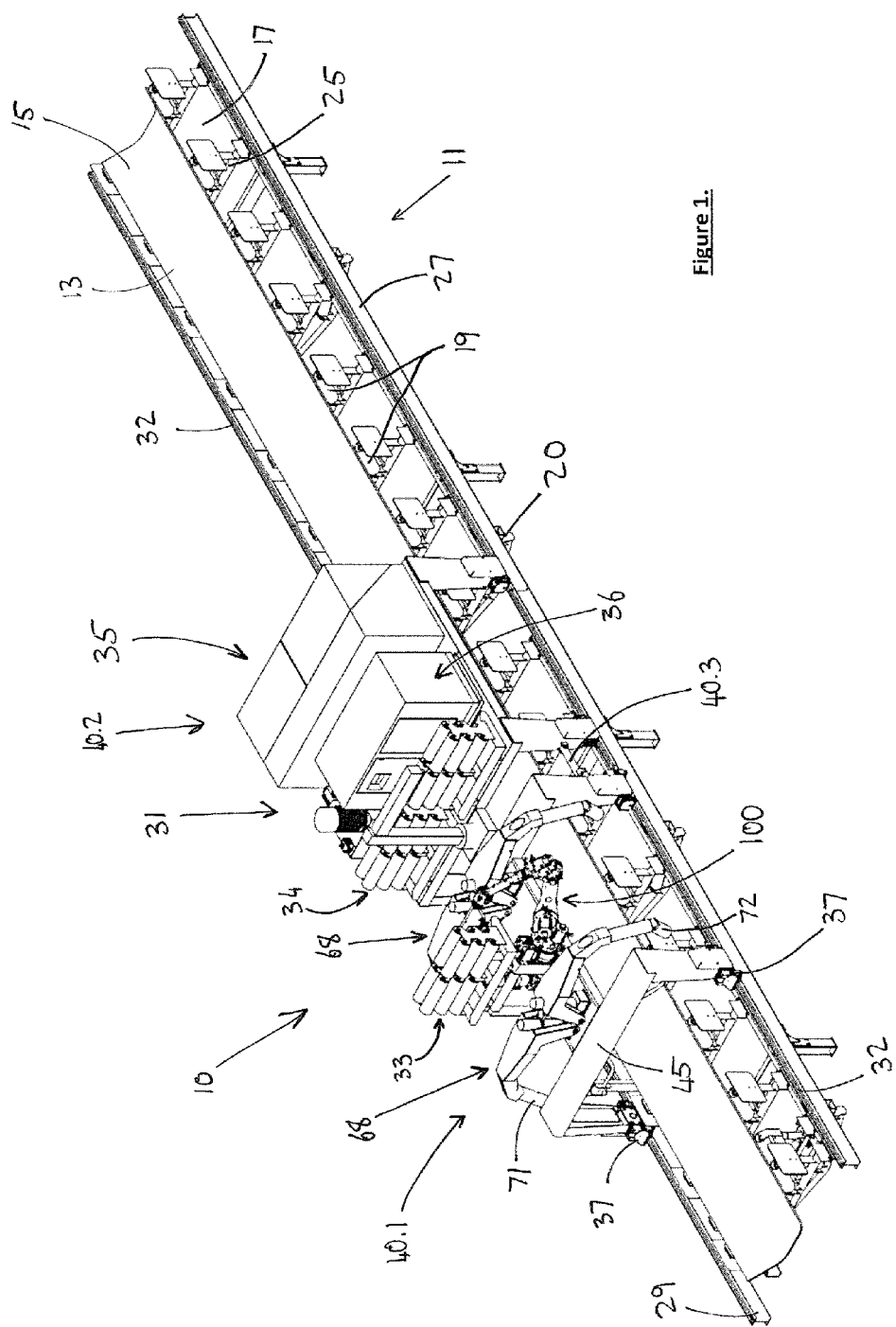
FIG. 1 is a schematic perspective view of apparatus for performing an idler roller replacement operation on a belt conveyor having a conveyor belt supported on a series of idler rollers.
Figure 2:
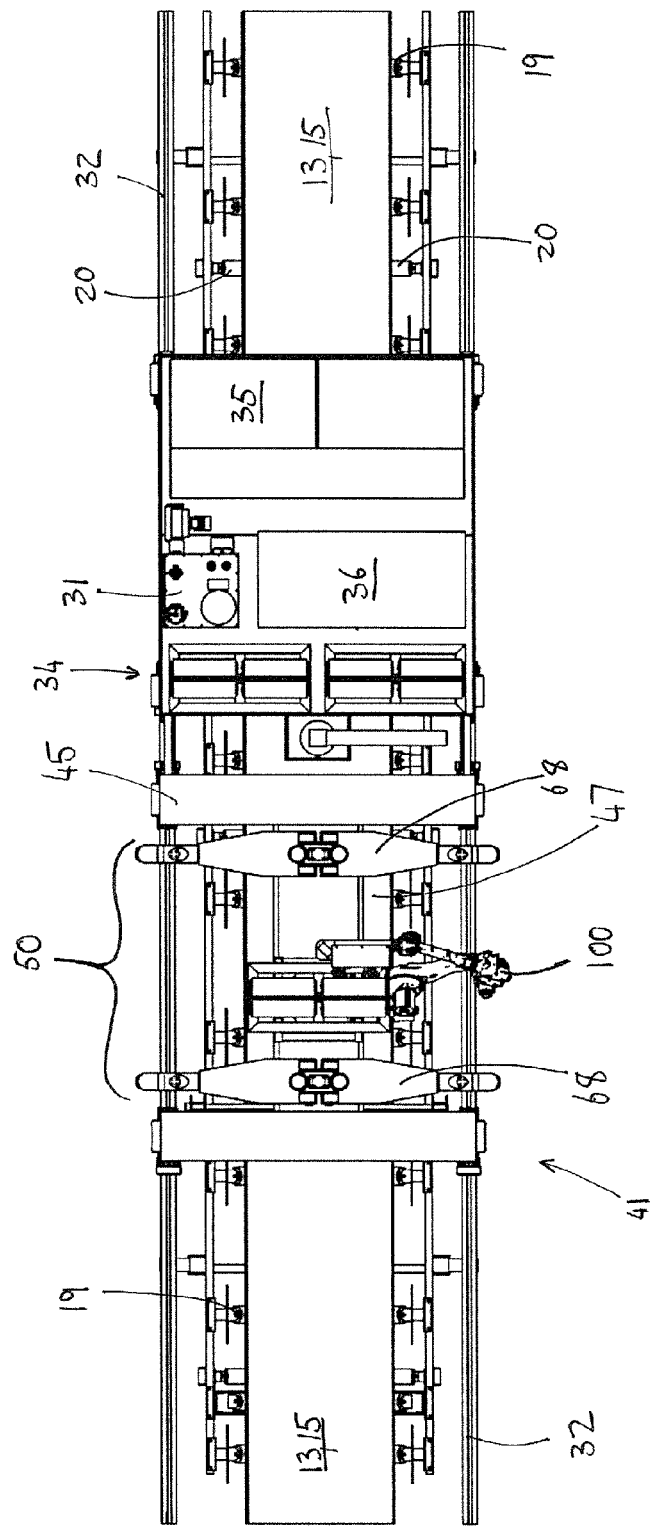
FIG. 2 is a top view of the apparatus of FIG. 1.
Figure 3:
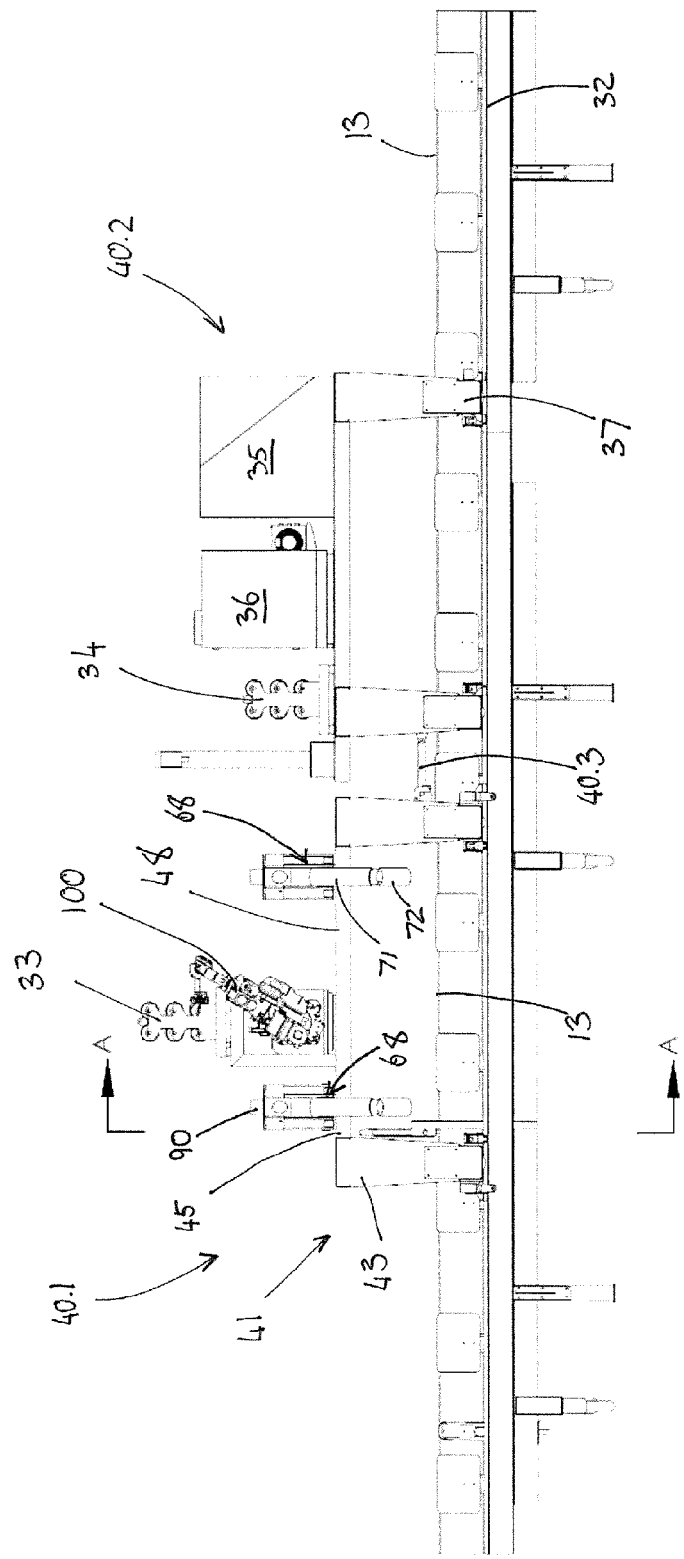
FIG. 3 is a side view of the apparatus of FIG. 1, showing the apparatus in position on the belt conveyor.

The following description provides examples of different embodiments of apparatus 10 for lifting a conveyor belt 13 from a belt conveyor 11. Features that are common to the art are not explained in any detail as they are deemed to be easily understood by the skilled person. In one example, the apparatus 10 facilitates the replacement of idler rollers (various rollers indicated by reference numerals 19, 20, 21 and 23) that support the belt 13. It is to be appreciated that the apparatus 10 finds particular application in the replacement of idler rollers whilst the belt 13 of the conveyor 11 is in motion and carrying material on the belt 13.

In this example, the apparatus 10 includes a body or carriage 41 selectively movable along the belt conveyor 11. The body or carriage 41 comprises a front carriage 40.1 and a rear carriage 40.2 linked together by means of a linkage 40.3, as shown. The front carriage 40.1 supports a belt lifting assembly 50 mounted on the body 41, said belt lifting assembly 50 operable to engage the conveyor belt 13 to lift the belt 13 from, and subsequently lower said belt 13 onto, idler rollers 19 operatively supporting the belt 13 on the conveyor 11. In the exemplified embodiment, the rear carriage 40.2 generally supports ancillary equipment, including a propulsion system 31 for propelling the carriage 41 along the conveyor 11, a power supply 35 for energising the apparatus 10, as well as sensing and control equipment 36, which will be described in more detail below. It is to be appreciated that other embodiments may feature different configurations and positioning of components.

As mentioned above, the apparatus 10 is generally configured for performing a roller change out operation on the belt conveyor 11, having an endless conveyor belt 13 passing around end rollers (not shown) to define an upper load carrying run 15 and a lower return run 17. The upper run 15 is supported at intervals by a series of upper idler roller sets 19, and the lower run 17 is supported at intervals by a series of lower idler roller sets 20. In the arrangement shown, the load carrying run 15 is of trough configuration, and the upper idler roller sets 19 supporting the trough configuration each comprises a horizontal central roller 21 and two inclined side rollers 23 on opposed sides of the central roller. The rollers 21 and 23 are supported in roller support cradles 25 mounted on a frame 27. The frame 27 is of a type well-known in the art and includes longitudinal stringers 29 extending along the length of the belt conveyor 11 on opposed sides thereof. The conveyor also typically includes a belt tie-down mechanism 38, shown in FIG. 4, which is used to secure the belt on the conveyor during strong weather conditions, as is well known in the art.

The apparatus 10 finds particular application for performing a roller change-out operation for replacement of defective upper idler rollers 19. The change-out operation involves lifting the upper run 15 of the conveyor belt 13 from a targeted defective roller, removing the defective roller, installing a replacement roller, and then returning the lifted section of the upper run 15 to its original position so it is supported on the replacement roller. In certain cases, more than one idler roller in a roller set 19 might require replacement at any one time.

The apparatus 10 according to the embodiment is typically provided for performing the roller change-out operation in an automated manner. Accordingly, the apparatus 10 generally includes some manner of sensing capability for sensing defective idler rollers. Such sensing equipment is typically housed in cabinet 36 and may include any sensor for detecting a defective roller, such as a thermal imaging camera for sensing higher-than-normal roller bearing temperatures, a vibration sensor for sensing abnormal vibrations of the rollers during operation, acoustic sensors for sensing faulty roller operation, and/or the like. Apparatus 10 also typically includes some manner of controller for controlling operation of the apparatus, i.e. propelling said apparatus along the conveyor 11 whilst sensing for faulty rollers and, if a faulty roller is detected, controlling the belt lifting assembly 50 to lift the belt 13 and a roller replacement mechanism 100 to change the faulty roller with a new roller.

As such, the apparatus 10 comprises the body 41 configured as the carriages 40.1 and 40.2 adapted for movement along the belt conveyor 11. The body or carriage 41 is typically configured to straddle the belt conveyor 11, as shown. In this example, the carriage 41 is configured for movement along a track 32 extending along the belt conveyor 11. A propulsion system 31 is provided for moving the carriages 40.1 and 40.2 along the track 32. The propulsion system 31 is energized via the power supply 35, which may include a generator, electrochemical cells, photovoltaic cells, and/or the like, and may include any suitable propulsion mechanism, such as an electric motor, internal combustion engine, a magnetic drive, and/or the like. The propulsion system 31 typically transfers propulsive energy via wheels 37 to a track 32. The track 32 is typically incorporated on the belt conveyor 11, or alternatively may be installed separately from the belt conveyor. Typically, the track 32 comprises two track rails disposed on opposed sides of the conveyor belt 13, as shown.

The apparatus 10 may include some manner of securing means, typically part of wheels 37, for securing the carriages 40.1 and 40.2 to the track. Such a securing means may include a rack and pinion arrangement, a mechanical detent or brake mechanism configured to engage and secure the carriages 40.1 and 40.2 to the track 32 or frame of the conveyor 11, a magnetic attachment, and/or the like. The securing means 37 finds particular application in securing the apparatus 10 when the belt lifting assembly 50 is lifting the belt, where motion of the apparatus is likely to have a negative performance impact. In addition, such a securing means 37 provides additional operational stability where the apparatus is operating on an uneven belt conveyor 11, such as replacing a roller on an incline/decline.

In one example, the front carriage 40.1 comprises a side frame structure 43 and an overhead frame structure 45. The side frame structure 43 and the overhead frame structure 45 may be of integral construction. The overhead frame structure 45 may comprises a series of spaced transverse overhead beams 47 and a central overhead beam 48 supported by the transverse beams 47, however it is to be appreciated that any configurations may be used to define or form a suitable framework for supporting the belt lifting assembly 50 described below. In addition, such a straddling framework is useful in avoiding collision with the belt tie-down 38 which is standard and many outdoor conveyors.

The apparatus 10 further comprises a belt lifting assembly 50 mounted on the front carriage 40.1 and operable to engage the conveyor belt 13 to lift and lower the conveyor belt with respect to the upper idler roller sets 19.

Figure 7:
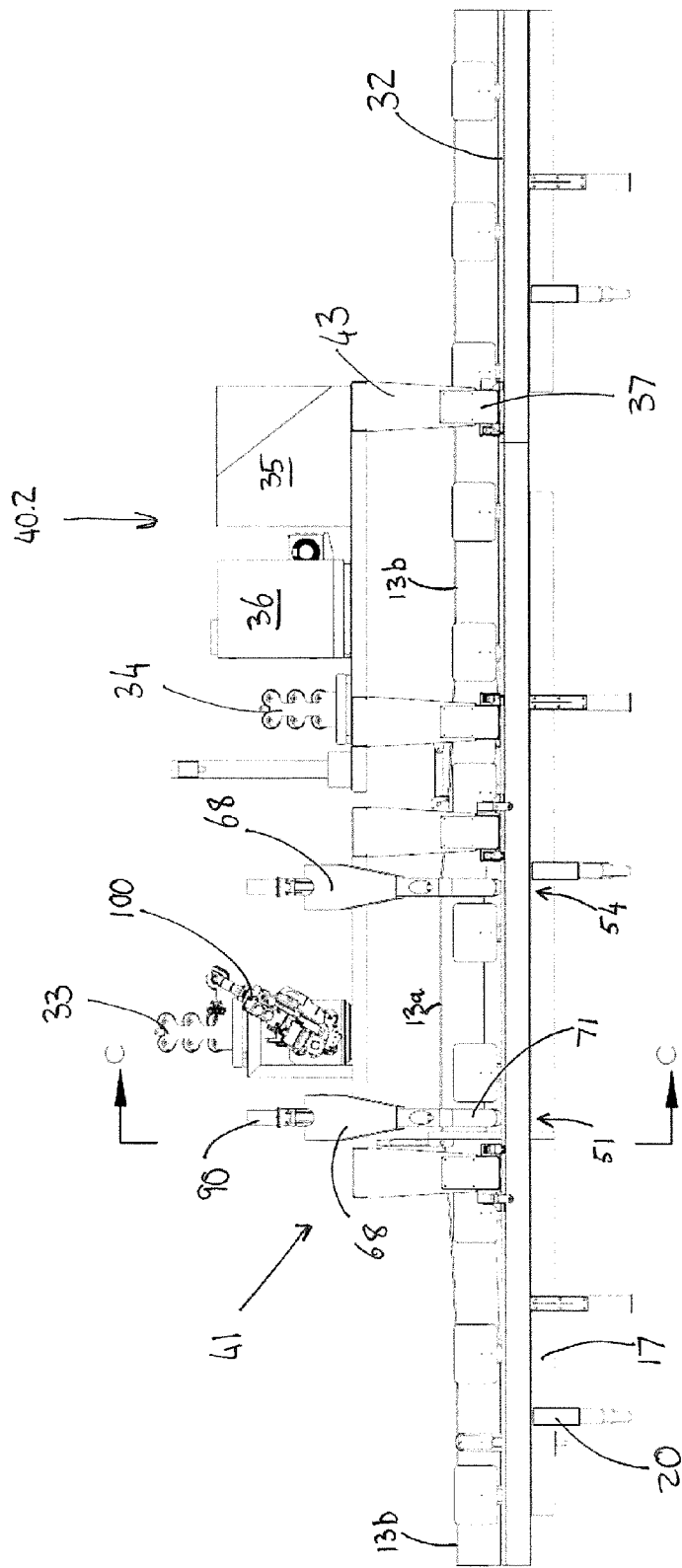
FIG. 7 is a side view of the apparatus, showing a belt lifting assembly lifting a section of the conveyor belt.

The belt lifting assembly 50 is adapted to lift a common section of the conveyor belt 13 at intervals along the length thereof, as best seen in FIG. 7 in which the lifted common section is identified by reference numeral 13a. Depending on requirements, the arrangement may be such that the common section 13a of the conveyor belt 13 is lifted to different extents along the length thereof to provide a relatively smooth transition between the lifted section 13a of the conveyor belt 13 and adjacent sections 13b thereof which are not lifted. This may offer advantages if the belt 13 carries particularly heavy material, or if the belt 13 moves at a high speed. Accordingly, the part of the lifted section 13a at which the belt 13 is lifted to the greatest extent is that part adjacent the particular roller set 19 in which a defective roller is to be replaced is located.

In the arrangement shown, the belt lifting assembly 50 is configured to only lift the section 13*a* of the conveyor belt 13 at two distinct lifting locations depicted in FIG. 7 as locations 51 and 54. However, in another example, the belt section 13*a* may be lifted to a higher level at additional intermediate locations than the locations 51 and 54 to thereby providing the smooth transition between the lifted section 13*a* and the adjacent sections 13*b* which are not lifted, as depicted in FIG. 7. It is to be appreciated that in such an example, the belt lifting assembly 50 may include additional carrier arms 68, described in more detail below.

The belt lifting assembly 50 comprises a belt support 61 (shown in FIG. 4), in the form of a pair of carrier arms 68, at each lifting location. These carrier arms 68 function in pairs, as shown, and are adapted for movement between a first position for engaging the upper run of the conveyor belt to lift and to lower the conveyor belt and a second position clear of the conveyor belt. In FIGS. 1 to 4, the belt supports 61 are depicted in the second position, away from the belt, or so-called 'travelling position', wherein the carrier arms 68 are away from the belt to allow the carriage 41 to move along the belt 13 without interference.

Figure 5:
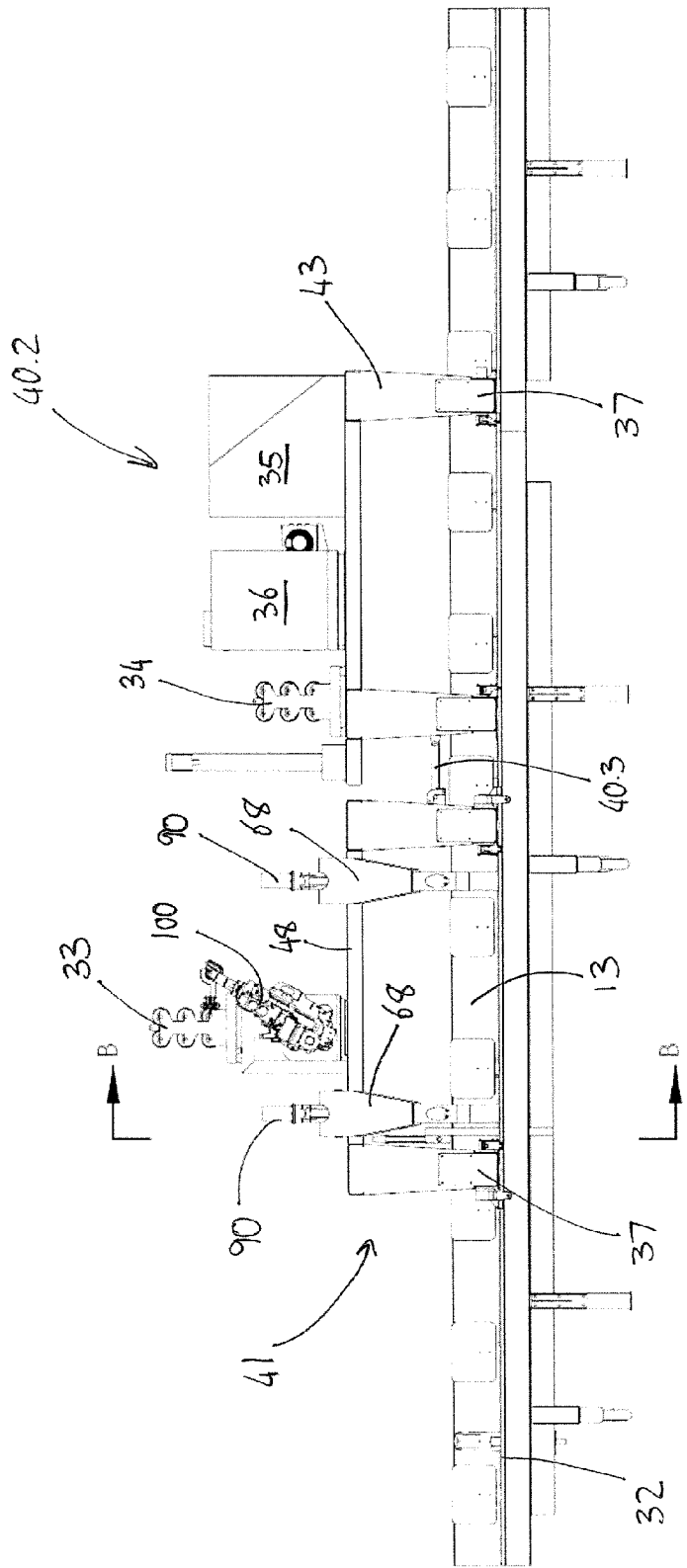
FIG. 5 is a side view of the apparatus, showing a belt lifting assembly engaging a section of the conveyor belt.
Figure 6:
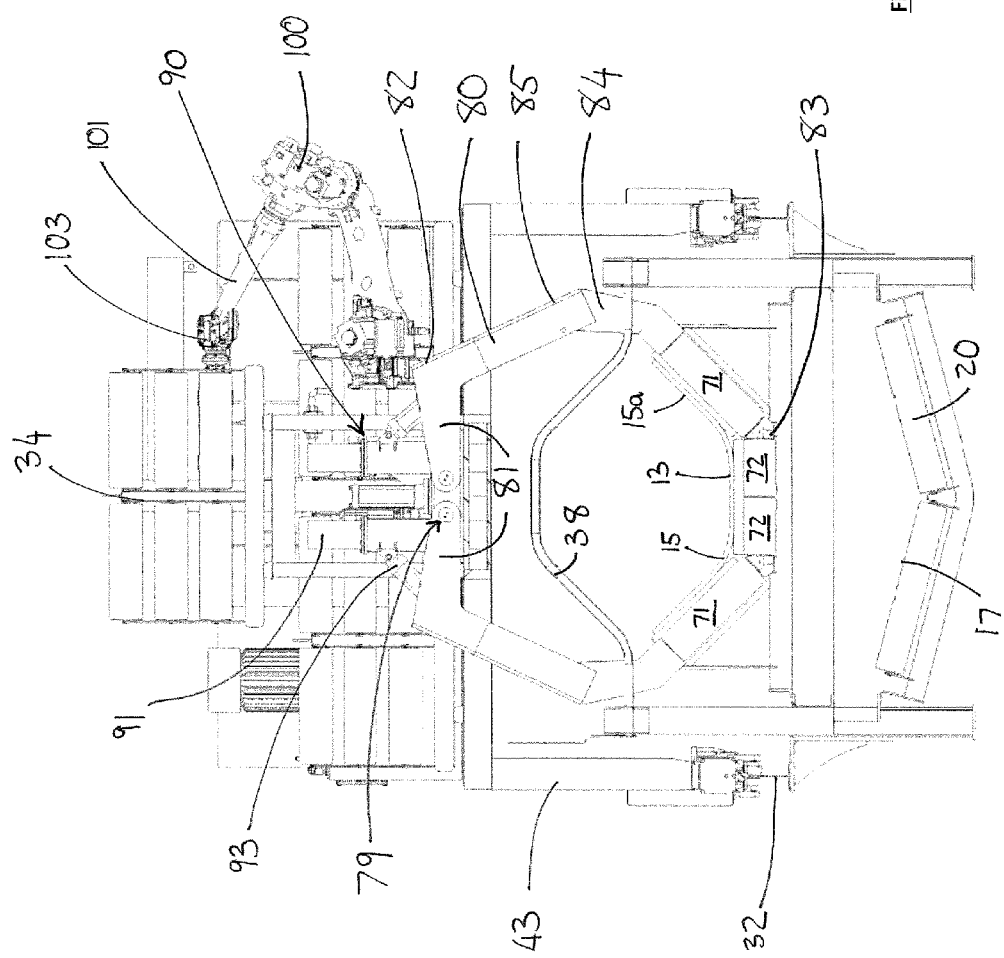
FIG. 6 is a cross-sectional view along line B-B of FIG. 5, showing the belt lifting assembly engaging the conveyor belt in more detail.

FIGS. 5 and 6 show the carrier arms 68 in the first position, engaging the belt 13 to lift or lower the belt 13 from the rollers 21 and 23 (best shown in FIGS. 8 and 10), but of course at any one time each belt support 61 can be in only its first position, its second position, or in some intermediate position there between.

Each belt support 61 comprises a pair of support sections 63, one per carrier arm 68, as shown, adapted to engage the underside of the upper run 15 of the belt 13 from opposed sides thereof to provide support for the belt while the belt is moving, as will be explained in more detail later.

The support sections 63 are mounted on a carrier 65, comprising the pair of carrier arms 68. The carrier arms 68 are disposed in opposed relation on opposite sides of the belt 13, each carrying one of the support sections 63.

Each carrier arm 68 is mounted for pivotal movement between the first or operative position and the second traveling or retracted position for moving the respective support section 63 into and out of a position below the underside of the upper run 15 of the conveyor belt 13. In the operative position, the carrier arm 68 positions the respective support section 63 below the underside of the upper run 15, as shown in FIG. 6. In the retracted or traveling position, the carrier arm 68 positions the respective support section 63 clear of the conveyor belt (which represents the second position of the belt support 61).

In the arrangement shown, there are two pairs of carrier arms 68, one pair corresponding to each of the two lifting locations 51 or 54. However, as mentioned above, different examples may include a different number of carrier arms 68.

Figure 4:
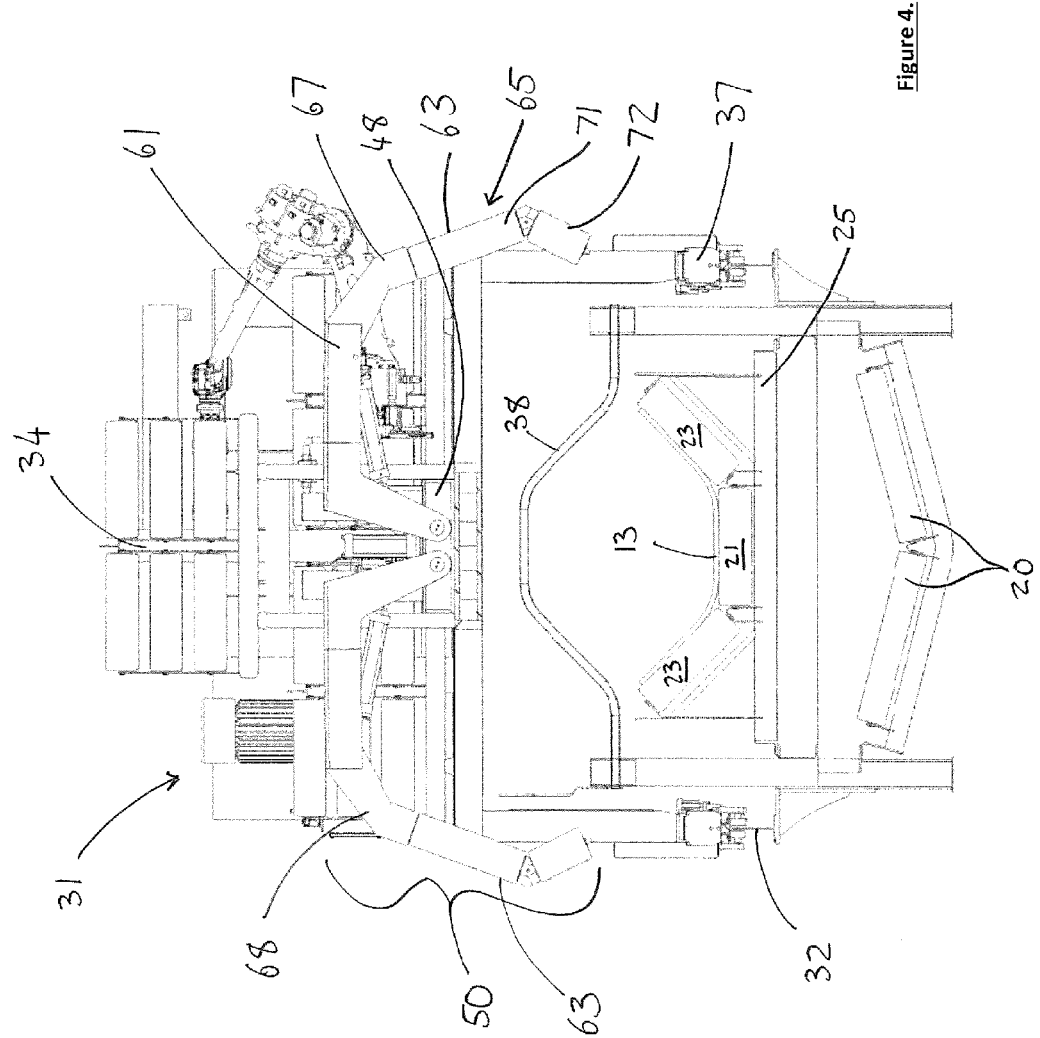
FIG. 4 is a cross-sectional view along line A-A of FIG. 3, showing the apparatus in more detail.

As best shown in FIGS. 4 and 6, each support section 63 generally comprises first and second support elements 71 and 72, wherein the first support element 71 is adapted to support an adjacent marginal edge portion 15*a* of the upper run 15 of the conveyor belt 13, and the second support element 72 is adapted to support a central section 15*b* of the upper run 15 of the conveyor belt 13.

Figure 8:
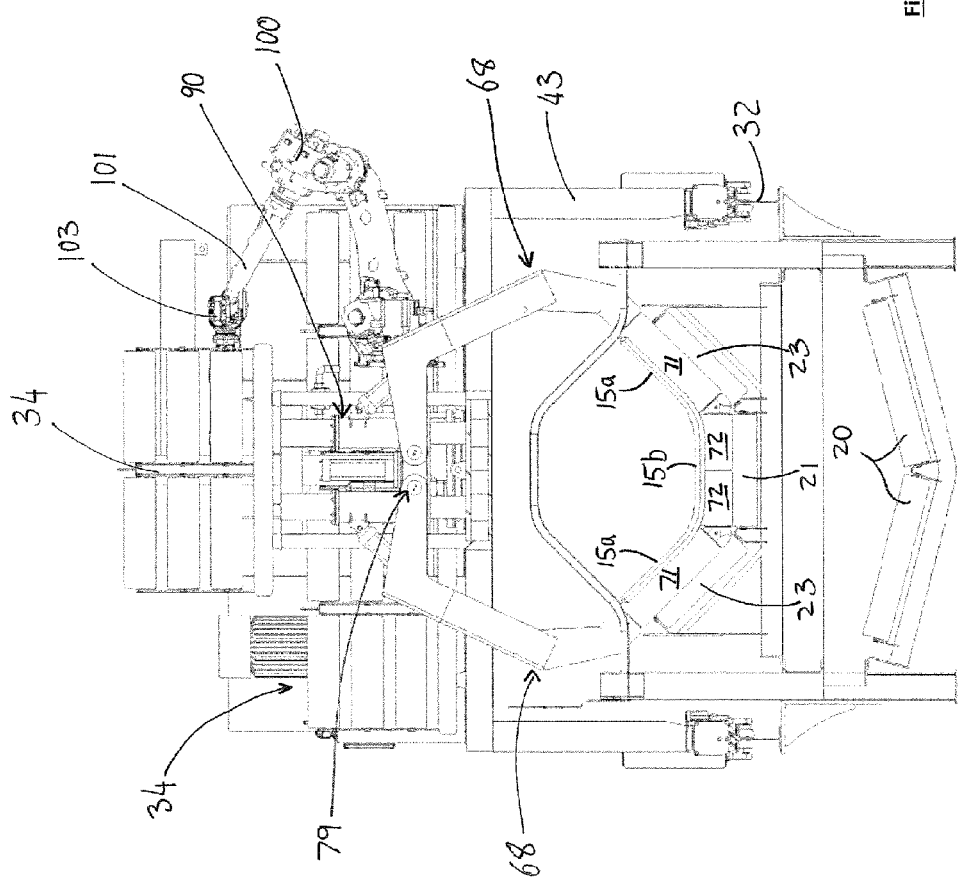
FIG. 8 is a cross-sectional view along line C-C of FIG. 7, showing the belt lifting assembly lifting the conveyor belt in more detail.

In the arrangement shown, the support elements 71 and 72 are configured as rollers. This is advantageous as it facilitates engagement of the conveyor belt 13 and also lifting and lowering of the conveyor belt while it is moving. As best seen in FIGS. 6 and 8, the second support elements 72 of the two opposed support sections 63 cooperate to support the central section 15*b* of the upper run 15 of the conveyor belt 13. More particularly, each second support element 72 functions to support the adjacent longitudinal portion of the central section 15*b*.

Each carrier arm 68 is of angular configuration, comprising a plurality of arm sections 80 disposed in end-to-end angular relation. The arm section 80 includes an innermost arm section 81 at which the carrier arm 68 is pivotally mounted at pivot 79 to the central beam 48, as best seen in FIGS. 4 and 6. The arm section 80 further includes an arm section 82 immediately the outermost arm section 81. As shown, the arm section 80 still further includes an outermost arm section 83, as well as an arm section 84 immediately the outermost arm section 83. Still further, the arm section 80 includes an intermediate arm section 85 between the two arm sections 82 and 84.

With this arrangement, the support elements 71 and 72 are mounted on the outermost arm section 83 and the adjacent arm section 84. In particular, the first support element 71 is mounted on the arm section 84 and the second support element 72 is mounted the outermost arm section 83. As mentioned above, the support elements 71 and 72 are configured as rollers, and the arrangement is such that the rollers are rotatably supported on the arm sections 83 and 84. The angular configuration of the carrier arms 68 is such that the support elements 71 and 72 are disposed to provide support for the underside of the upper run 15 of the conveyor belt 13 when the carrier arms 68 are in the operative position engaging the belt 13.

A power input device 90 is provided to actuate the carrier arms 68 between the first and second positions as well as to displace the arms 68 when in the operative position in order to lift the belt 13 from the idler rollers 21 and 23, as shown in FIG. 8.

The power input device 90 is operably connected to the pair of carrier arms 68 to actuate the carrier arms 68 for pivotal movement between the operative and retracted positions. The power input device 90 comprises a linear actuator such as a first hydraulic ram 93 operable between the carrier arms 68, wherein extension and retraction of the hydraulic ram 93 causes pivotal movement of the carrier arms about the pivots 79 between the first and second positions. In the arrangement shown, the hydraulic ram 93 is connected to the innermost arm sections 81 of the carrier arms 68 and a second hydraulic ram 91. Extension and retraction of this second hydraulic ram 91 lifts the carrier arms 68 when in the operative first position in order to lift the belt 13 from the rollers 21 and 23.

As mentioned, each pair of carrier arms 68 is mounted for displacement vertically when in the operative position to facilitate movement of the support elements 71 and 72 into and out of engagement with the underside of the upper run 15 of the conveyor belt 13, and also lifting and lowering the conveyor belt 13. As shown from FIGS. 6 to 8, this is accomplished by the second hydraulic ram 91 which selectively raises and lowers the respective pivots 79. With this arrangement, the opposed carrier arms 68 in each pair of carrier arms would be raised and lowered in unison.

The apparatus 10 further comprises a mechanism 100 for replacing defective idler rollers in the upper idler roller sets 19.

Figure 9:
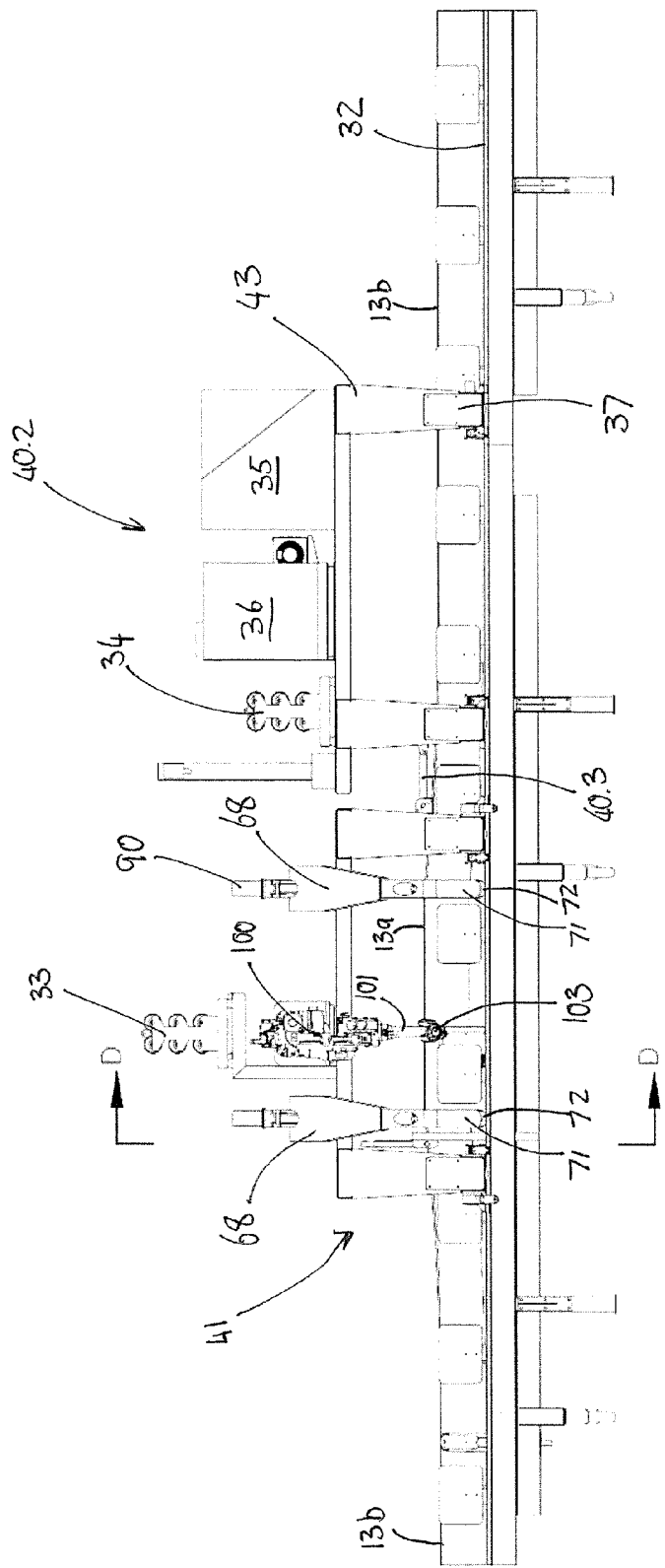
FIG. 9 is a side view of the apparatus, showing a belt lifting assembly lifting a section of the conveyor belt and a mechanism for replacing an idler roller in operation.
Figure 10:
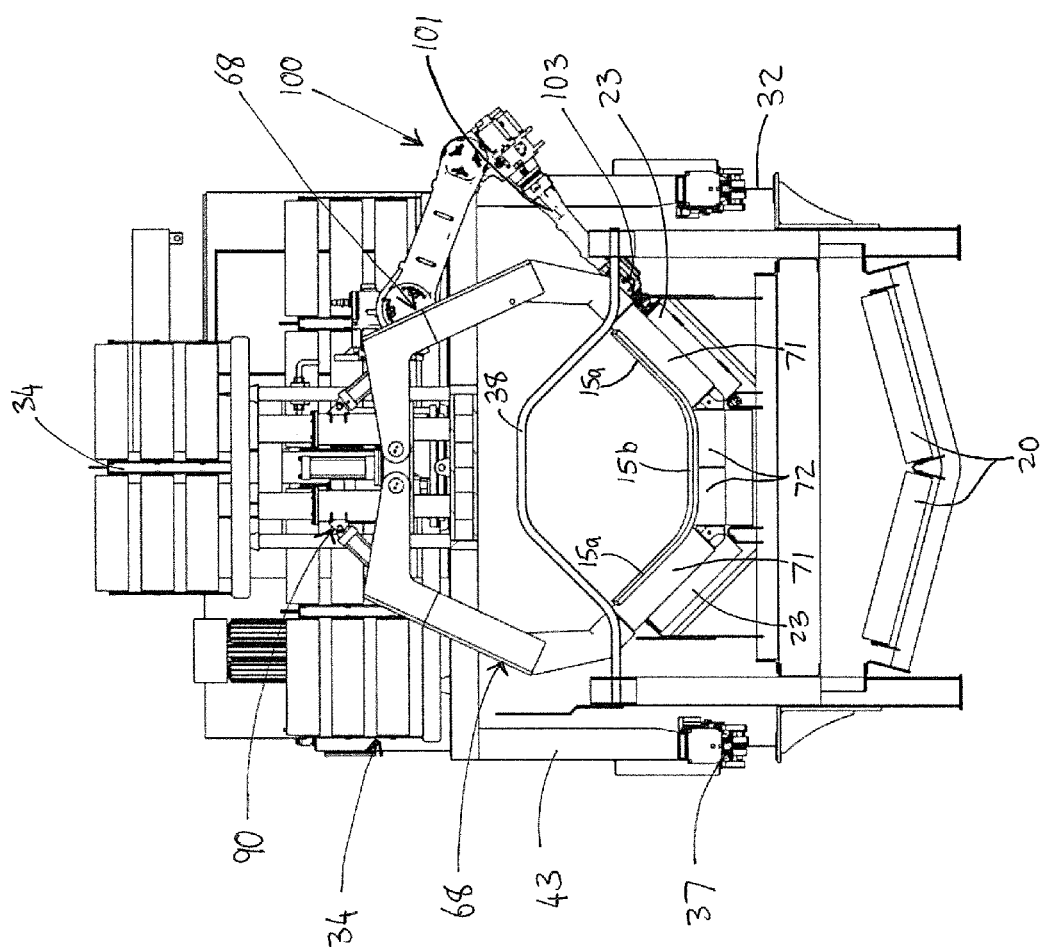
FIG. 10 is a cross-sectional view along line D-D of FIG. 9, showing the belt lifting assembly lifting the conveyor belt and the mechanism for replacing an idler roller in operation in more detail.

In the arrangement illustrated, the replacement mechanism 100 comprises a robotic arm 101 mounted on the carriage 41. The robotic arm 101 is of articulated construction and autonomous, but may also be remote controlled or have a semi-autonomous configuration. The robotic arm 101 has an end effector 103 configured as a gripper mechanism for handling idlers rollers and performing roller replacement operations. FIGS. 9 and 10 show the robotic arm engaging a roller 23 for replacement.

The robotic arm 101 is arranged to access the central roller 21 and side rollers 23 in a target upper roller set 19 once the conveyor belt 13 has been lifted from the roller set. In one arrangement, the robotic arm 101 may be configured to operate from a fixed position on the carriage 41 and to have sufficient reach to access any of the rollers 21 and 23. In another arrangement, the robotic arm 101 may be mounted on the carriage 41 for movement into a variety of positions to facilitate access any of the rollers 21 and 23. In the latter arrangement, the robotic arm 101 may be mounted on a turntable of rail (not shown) facilitating travel of the robotic arm from one side of the conveyor belt 15 to the other, thereby facilitating access to any of the rollers 21 and 23. In one embodiment, the robotic arm 101 is mounted on a turntable to the carriage to allow the arm to freely turn in order to access the different rollers on the conveyor 11, as required.

Typically, the apparatus 10 carries a supply of replacement idler rollers and also have a facility to receive defective rollers which have been removed. In this example, the apparatus 10 includes an active roller nest 33 on the front carriage 40.1, which is readily accessible by the robot arm 101 to replace rollers. The apparatus also includes additional spare roller nests 34 on the rear carriage 40.2, as shown, for storing additional replacement or used rollers.

The apparatus 10 may be a permanent installation on the belt conveyor 11 or may be installed on the belt conveyor as required when a roller change-out operation is to be performed.

When a roller change-out operation is to be performed, the carriage 41 is moved along the belt conveyor 11 to a position at which there is an idler roller requiring replacement. The sensing equipment 36 may be configured to detect imminent roller failure or defective roller operation, as described above. The power input devices 90 are actuated to move the carrier arms 68 from the retracted position into the operative position, thereby moving the support sections 63 into position on the underside of the upper run 15 of the belt 13 from opposed sides thereof. The carrier arms 68 are then displaced vertically by the hydraulic rams 91 when in the operative position to move the support sections 63 into engagement with the underside of the upper run 15 of the belt 13 and then lift the conveyor belt 13 from the roller set 19. The roller configuration of the support sections 63 allows the conveyor belt 13 to continue to move, and to perform its load-carrying function, while supported in the lifted position. Once the conveyor belt 13 has been lifted, the robotic arm 101 can be deployed to perform the necessary roller change-out, which may involve replacement of any one or more of the idler rollers in the target roller set 19. Once the roller change-out operation has been performed, the carrier arms 68 are then lowered to return the conveyor belt 13 into its supported position on the roller set 19. The power input devices 90 are actuated to return the carrier arms 68 to the retracted position. The carriages 40.1 and 40.2 can then be moved along the belt conveyor 11 to the next position at which there is an idler roller requiring replacement, and the procedure repeated.

It should be appreciated that the scope of the invention is not limited to the scope of the embodiment described. Various modifications and improvements may be made to the embodiment described without departing from the scope of the invention.

While the embodiment has been described in relation to performance of an idler roller change-out operation on a belt conveyer which is in operation, it should be understood that the apparatus may also be used to perform a roller change-out operation while the conveyor belt is stationary.

Further, while the embodiment has been described in relation to performance of an idler roller change-out operation on idler roller sets supporting an upper run of a belt conveyer, it should be understood that the apparatus may also be used to perform a roller change-out operation on idler roller sets supporting a lower run of a belt conveyer Throughout this specification, unless the context requires otherwise, the word "comprise" or variations such as "comprises" or "comprising", will be understood to imply the inclusion of a stated integer or group of integers but not the exclusion of any other integer or group of integers.

It is to be appreciated that reference to "one example" or "an example" of the invention is not made in an exclusive sense. Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise.

The claims describing the invention are as follows:

1. An apparatus for lifting a conveyor belt from a belt conveyor, the apparatus comprising:
   a body selectively movable along the belt conveyor;
   a belt lifting assembly mounted on the body and operable to engage the conveyor belt to lift the belt from, and subsequently lower said belt onto, an idler roller operatively supporting the belt on the conveyor;
   a robotic arm having means for gripping an idler roller, said arm configured for replacing an idler roller from which the conveyor belt has been lifted;
   a sensor configured to sense defective idler roller operation; and
   a controller configured to control the robotic arm and the belt lifting assembly in response to the sensor sensing a defective roller in order to lift the belt and replace a defective roller in an automated manner.

2. The apparatus of claim 1, wherein the belt lifting assembly includes rollers for supporting the belt on in order to lift the belt whilst the belt is in motion.

3. The apparatus of claim 1, wherein the belt lifting assembly comprises a belt support movable between an operative position for engaging the conveyor belt to lift or to lower the conveyor belt, and a retracted position clear of the conveyor belt.

4. The apparatus of claim 3, wherein the belt support comprises a pair of support sections each adapted to engage the underside of the conveyor belt from opposed sides thereof when in the operative position, the support sections each being adapted to cooperate to provide support for the belt.

5. The apparatus of claim 4, wherein each support section comprises first and second support elements, the first support element being adapted to support an adjacent marginal edge portion of the conveyor belt and the second support element being adapted to support a central section of conveyor belt.

6. The apparatus of claim 4, wherein the belt support comprises a carrier for moving the pair of support sections into and out of engagement with the conveyor belt, the carrier comprising a pair of carrier arms each carrying one of the support sections, wherein each carrier arm is mounted for pivotal movement between the operative or retracted positions.

7. The apparatus of claim 6, wherein the belt lifting assembly includes a power input device operably connected to the pair of carrier arms to actuate the carrier arms for pivotal movement between the operative and retracted positions.

8. The apparatus of claim 6, wherein each carrier arm is adapted for displacement when in the operative position between a lifted position, in which the belt is lifted from the idler roller of the belt conveyor, and a lowered position, in which the belt is supported by the idler roller.

9. The apparatus of claim 3, wherein the belt lifting assembly comprises a plurality of the belt supports disposed in a spaced apart relation on the body of the apparatus for lifting a common section of the conveyor belt to several different extents to provide a relatively smooth transition between the lifted section of the conveyor belt and the adjacent sections thereof which are not lifted.

10. The apparatus of claim 1, wherein the body selectively movable along the belt conveyor comprises a carriage configured to straddle the conveyor belt, said carriage comprising a frame structure upon which the belt lifting assembly is mounted.

11. The apparatus of claim 10, wherein the carriage is arranged for movement along a track associated with the belt conveyor, said carriage including a drive system for propelling the carriage along the track.

12. The apparatus of claim 11, which includes a securing mechanism for securing the apparatus to the track.

13. The apparatus of claim 1, wherein the sensor is selected from a group consisting of a thermal sensor, an acoustic sensor, or a vibration sensor.

14. A method of lifting a conveyor belt using apparatus according to claim 1.

15. A method of performing a roller replacement operation on a belt conveyor using apparatus according to claim 1.

* * * * *